(12) United States Patent
Nakamura

(10) Patent No.: US 8,249,393 B2
(45) Date of Patent: Aug. 21, 2012

(54) IMAGE PROCESSING APPARATUS AND IMAGE PROCESSING METHOD

(75) Inventor: Naohito Nakamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 878 days.

(21) Appl. No.: 12/360,269

(22) Filed: Jan. 27, 2009

(65) Prior Publication Data
US 2009/0195557 A1    Aug. 6, 2009

(30) Foreign Application Priority Data
Feb. 5, 2008    (JP) ................. 2008-025731

(51) Int. Cl.
*G06K 9/36* (2006.01)
(52) U.S. Cl. ................ 382/291; 382/286; 382/106
(58) Field of Classification Search .............. None
See application file for complete search history.

(56) References Cited

U.S. PATENT DOCUMENTS

| | | | | |
|---|---|---|---|---|
| 6,993,450 | B2 * | 1/2006 | Takemoto et al. | 702/153 |
| 7,519,218 | B2 * | 4/2009 | Takemoto et al. | 382/165 |
| 7,698,094 | B2 * | 4/2010 | Aratani et al. | 702/150 |
| 7,737,944 | B2 * | 6/2010 | Harrison et al. | 345/156 |
| 7,782,297 | B2 * | 8/2010 | Zalewski et al. | 345/156 |
| 7,970,576 | B2 * | 6/2011 | Satoh | 702/153 |
| 2005/0253871 | A1 * | 11/2005 | Anabuki et al. | 345/633 |
| 2006/0227211 | A1 * | 10/2006 | Kotake et al. | 348/141 |

FOREIGN PATENT DOCUMENTS

| | | |
|---|---|---|
| JP | 2003-203252 | 7/2003 |
| JP | 2005-107248 | 4/2005 |
| JP | 2005-326275 | 11/2005 |

OTHER PUBLICATIONS

D.G. Lowe, "Fitting Parameterized Three-Dimensional Models to Images", IEEE Transactions on Pattern Analysis and Machine Intelligence, vol. 13, No. 5, pp. 441-450 (May 1991).
T. Höllerer, et al., "Situated Documentaries: Embedding Multimedia Presentations in the Real World", Proceedings of ISWC, pp. 79-88 (Oct. 18-19, 1999).

* cited by examiner

*Primary Examiner* — Chan S Park
*Assistant Examiner* — Nancy Bitar
(74) *Attorney, Agent, or Firm* — Fitzpatrick, Cella, Harper & Scinto

(57) ABSTRACT

An index detection unit (1040) detects the coordinate values of indices in a sensed image sensed by an image sensing device (1020) attached with an orientation sensor (1010). A contribution degree calculation unit (1070) acquires contribution degrees according to a frequency at which the image sensing device (1020) is located to have an orientation indicated by orientation information included in the position and orientation information of the image sensing device (1020) at the time of image sensing. A data management unit (1060) generates sets of the coordinate values and orientation information measured by the orientation sensor (1010) at the time of sensing of the sensed image for respective indices. A calibration information calculation unit (1090) calculates an orientation of the orientation sensor (1010) with respect to the image sensing device (1020) using the position and orientation information, parameter values, and the sets generated for the respective indices.

5 Claims, 4 Drawing Sheets

IMAGE PROCESSING APPARATUS AND IMAGE PROCESSING METHOD

BACKGROUND OF THE INVENTION

1. Field of the Invention

The present invention relates to a correction technique of the position and orientation of an image sensing device.

2. Description of the Related Art

In recent years, studies about mixed reality (MR) that aims at seamless merging of a physical space and virtual space have been extensively made. An image display apparatus which presents MR is implemented by an apparatus having the following arrangement. That is, an apparatus displays an image by superimposing and rendering an image of the virtual space (for example, a virtual object rendered by computer graphics and text information) generated according to the position and orientation of an image sensing device such as a video camera on an image of the physical space sensed by the image sensing device.

As an application of such image display apparatus, a navigation that superimposes names and guides of well-known buildings and the like included in an image obtained by sensing an urban area is expected. Furthermore, a scenery simulation that superimposes a computer graphics video image of a building to be planned to construct on a planned construction site of that building is also expected.

Common requirements to these applications are how precisely to attain registration between the physical and virtual spaces, and many approaches have been conventionally made. In order to precisely attain registration between the physical and virtual spaces, camera parameters (intrinsic and extrinsic parameters) required to generate an image of the virtual space need only always match those of an image sensing device. If the intrinsic parameters of the image sensing device are given, a problem of registration in MR results in that of calculating the extrinsic parameters of the image sensing device, i.e., the position and orientation of the image sensing device on a world coordinate system set on the physical space.

As a method of calculating the position and orientation of the image sensing device on the world coordinate system set on the physical space, for example, non-patent reference 1 has made the following proposal. That is, non-patent reference 1 has proposed that the position and orientation of the image sensing device are obtained by combining the orientation measurement of the image sensing device using an orientation sensor and the position measurement of the image sensing device by means of a global positioning system or the like.

As typical orientation sensors used in such method, TISS-5-40 available from TOKIMEC, INC., and InertiaCube2 available from InterSense, Inc., U.S.A., are available. Each of these orientation sensors mainly comprises a gyro sensor which detects an angular acceleration in the three-axis directions, and an acceleration sensor for detecting an acceleration in the three-axis directions, and measures the orientation (azimuth, pitch angle, and roll angle) of the three axes by combining their measured values. In general, angle information obtained by the gyro sensor alone is only a relative change in orientation with respect to an orientation at a certain time. However, since these orientation sensors measure the direction of gravitational force of the earth using the acceleration sensor, absolute angles with reference to the direction of gravitational force can be obtained in association with tilt angles (i.e., pitch and roll angles).

The orientation measured value output from the orientation sensor represents the orientation of the sensor itself on a sensor coordinate system defined by the sensor itself independently of the world coordinate system. For example, in case of TISS-5-40 above, the sensor coordinate system is defined to have the direction of gravitational force (downward direction) as a Z-axis, and the frontal direction of the sensor at the time of sensor initialization on an X-Y plane specified by this Z-axis as an X-axis. In case of InertiaCube2, the sensor coordinate system is defined to have the direction of gravitational force (downward direction) as a Z-axis, and the north direction indicated by an internal geomagnetic sensor at the time of sensor initialization on an X-Y plane specified by this Z-axis as an X-axis. In this way, it is a common practice that the orientation measured value by the orientation sensor is not the orientation itself of an object to be measured (the image sensing device in case of the image display apparatus that presents MR) on the world coordinate system as information to be acquired.

That is, the orientation measured value by the orientation sensor cannot be used intact as the orientation of the object to be measured on the world coordinate system, and some coordinate transform is required. More specifically, a coordinate transform (Local Transform) that transforms the orientation of the sensor itself into that of the object to be measured, and a coordinate transform (World Transform) that transforms the orientation on the sensor coordinate system into that on the world coordinate system are needed.

The World Transform is a transform defined by the orientation of the sensor coordinate system with respect to the world coordinate system.

As described above, the sensor coordinate system is determined according to the direction of gravitational force. Therefore, a direction, on the world coordinate system, of the gravity axis of the sensor coordinate system (the Z-axis in case of TISS-5-40 and InertiaCube2) can be uniquely determined based on the definitions of the direction of gravitational force on the sensor coordinate system and world coordinate system. Using this information, the World Transform can be calculated while leaving indefiniteness in a rotation angle about the gravity axis. More specifically, a three-dimensional (3D) vector 1 that represents the vertically upward direction on the world coordinate system, and a 3D vector g that represents the vertically upward direction on the sensor coordinate system are prepared, and an angle β the two vectors make is calculated based on the inner product g·1 of g and 1. Furthermore, a normal vector n=g×1 to a plane defined by the two vectors is calculated based on the outer product of g and 1. Upon calculating a rotation matrix $R^*_{WC}$ that implements a coordinate transform to have the vector n as a rotation axis and the angle β as a rotation angle, this becomes the orientation of an axis corresponding to the direction of gravitational force with respect to the world coordinate system. It is known that this calculation method can be implemented by a known method (see patent reference 1). Hence, only the rotation angle about the gravity axis of the World Transform is unknown.

This unknown parameter is geometrically equivalent to an "azimuth drift error" as an accumulated error of the orientation measured values about the gravity axis, which is generated as an elapse of time when the orientation sensor is a gyro sensor. Thus, if the rotation angle about the gravity axis left as an unknown value is interpreted as an "initial value of the azimuth drift error", this parameter can be considered as a part of the azimuth drift error of the sensor, which changes dynamically. Accordingly, the World Transform can be considered as a given value (which can be derived based on the relationship of the gravity axis). Also, it is known that the automatic measurement (automatic correction) of the azimuth drift error can be implemented by a known method using image information if the Local Transform is given (see patent reference 2).

A method of calculating the Local Transform to be used as a given value is disclosed in patent reference 3. With this method, a plurality of indices whose layout positions on the world coordinate system are given are placed or set on the physical space or a target object. Then, the Local Transform is calculated using the 3D coordinates of these indices as given information on the world coordinate system, the coordinates of projected images of the indices in an image sensed by an image sensing device, and the output information of the orientation sensor at that time.

[Patent Reference 1] Japanese Patent Laid-Open No. 2005-107248
[Patent Reference 2] Japanese Patent Laid-Open No. 2003-203252
[Patent Reference 3] Japanese Patent Laid-Open No. 2005-326275
[Non-patent Reference 1] T. Hollerer, S. Feiner, and J. Pavlik, Situated documentaries: embedding multimedia presentations in the real world, Proc. International Symposium on Wearable Computers '99, pp. 79-86, 1999.

However, the method disclosed in patent reference 3 is not always effective when the orientation information at the time of use of the image sensing device that mounts the orientation sensor is taken into consideration. This is because since the method disclosed in patent reference 3 equally handles image information sensed by the image sensing device and the output information of the orientation sensor at that time so as to calculate them at equal weights, the calibration result contains nearly equal estimation errors with respect to every orientation. The above method is effective when the image sensing device that mounts the orientation sensor equally takes every orientation. However, when the frequencies of orientations that the image sensing device takes at the time of use have differences, the obtained calibration result contains nearly equal errors independently of the orientations of the image sensing device.

SUMMARY OF THE INVENTION

The present invention has been made in consideration of the aforementioned problems, and has as its object to provide a technique for calculating the orientation of an orientation sensor attached to an image sensing device with respect to this image sensing device in consideration of the frequencies of possible orientations.

According to the first aspect of the present invention, there is provided an image processing apparatus comprising: a unit which holds layout position information indicating a layout position on a physical space of each of a plurality of indices laid out on the physical space; a unit which acquires an image of the physical space by sensing the physical space using an image sensing device attached with an orientation sensor; a unit which detects indices in the image of the physical space, and calculates coordinate values of the detected indices in the image; a unit which acquires orientation information measured by the orientation sensor at the time of sensing of the image of the physical space; an acquisition unit which acquires position and orientation information of the image sensing device at the time of sensing of the image of the physical space, and acquires a parameter value according to a frequency at which the image sensing device is located to have an orientation indicated by orientation information included in the acquired position and orientation information; a generation unit which generates sets of the coordinate values and the orientation information for the respective indices in the image of the physical space; and a calculation unit which calculates an orientation of the orientation sensor with respect to the image sensing device using the position and orientation information, the parameter value, and the sets generated for the respective indices by the generation unit, wherein the calculation unit calculates errors between projected positions, on the image of the physical space, of the layout positions indicated by the layout position information based on the position and orientation information, and positions indicated by the coordinate values for the respective indices in the image of the physical space, and calculates the orientation of the orientation sensor with respect to the image sensing device using the calculated errors for the respective indices and the parameter value.

According to the second aspect of the present invention, there is provided an image processing method to be executed by an image processing apparatus, which holds layout position information indicating a layout position on a physical space of each of a plurality of indices laid out on the physical space, comprising: a step of acquiring an image of the physical space by sensing the physical space using an image sensing device attached with an orientation sensor; a step of detecting indices in the image of the physical space, and calculating coordinate values of the detected indices in the image; a step of acquiring orientation information measured by the orientation sensor at the time of sensing of the image of the physical space; an acquisition step of acquiring position and orientation information of the image sensing device at the time of sensing of the image of the physical space, and acquiring a parameter value according to a frequency at which the image sensing device is located to have an orientation indicated by orientation information included in the acquired position and orientation information; a generation step of generating sets of the coordinate values and the orientation information for the respective indices in the image of the physical space; and a calculation step of calculating an orientation of the orientation sensor with respect to the image sensing device using the position and orientation information, the parameter value, and the sets generated for the respective indices in the generation step, wherein in the calculation step, errors between projected positions, on the image of the physical space, of the layout positions indicated by the layout position information based on the position and orientation information, and positions indicated by the coordinate values are calculated for the respective indices in the image of the physical space, and the orientation of the orientation sensor with respect to the image sensing device is calculated using the calculated errors for the respective indices and the parameter value.

Further features of the present invention will become apparent from the following description of exemplary embodiments with reference to the attached drawings.

DESCRIPTION OF THE EMBODIMENTS

Preferred embodiments of the present invention will be described in detail hereinafter with reference to the accompanying drawings. Note that these embodiments will be described as examples of the preferred arrangements of the invention described in the scope of the claims, and the invention is not limited to the embodiments to be described hereinafter.

First Embodiment

An image processing apparatus according to this embodiment acquires coordinate transform information required to transform the orientation of a sensor itself into that of an image sensing device. The image processing apparatus according to this embodiment also presents MR using a calibration result of position and orientation information of the sensor so as to confirm that calibration result. The image processing apparatus (image processing method) according to this embodiment will be described below.

Figure 1:
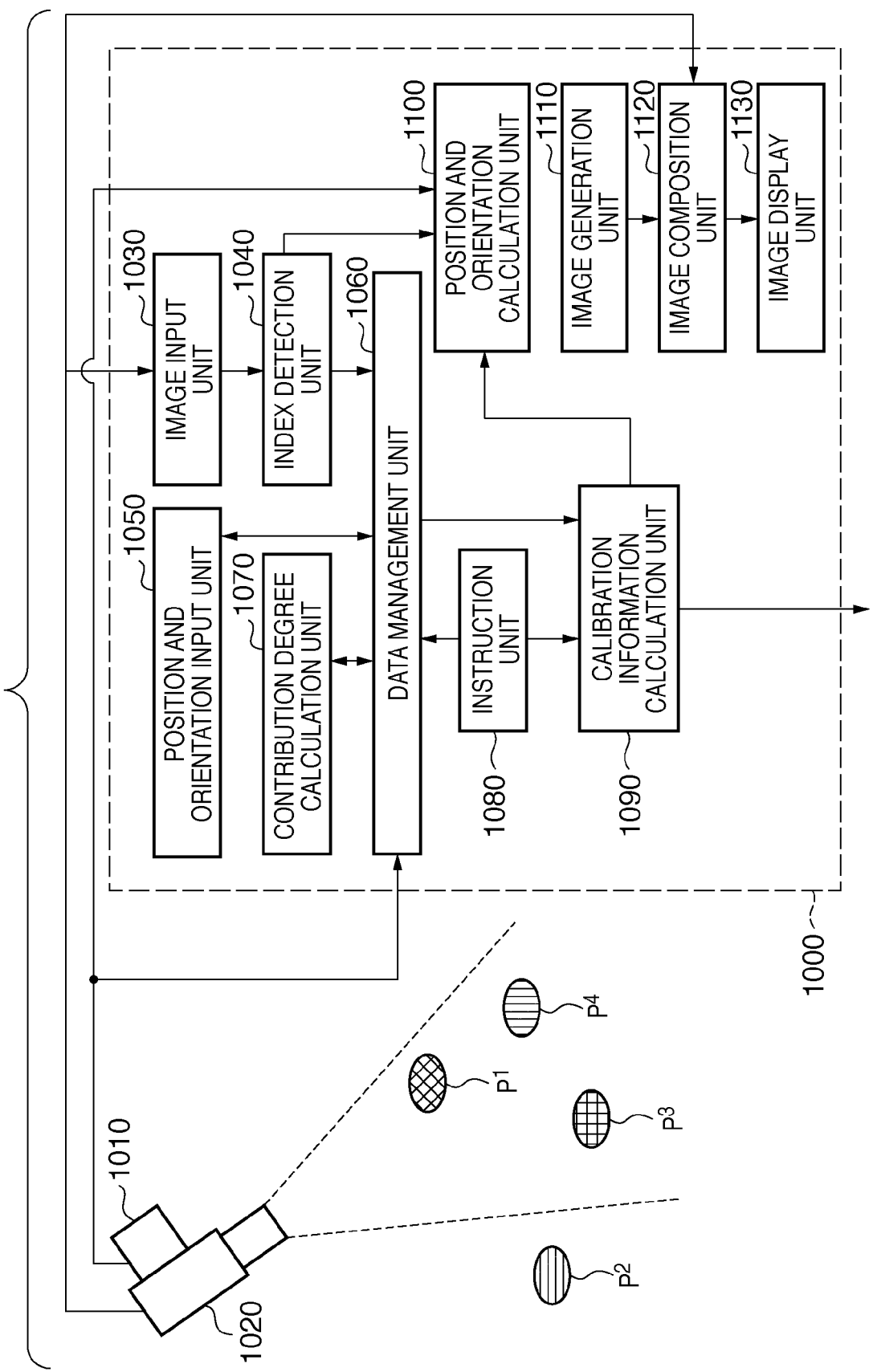
FIG. 1 is a block diagram showing an example of the functional arrangement of a system according to the first embodiment of the present invention.

FIG. 1 is a block diagram showing an example of the functional arrangement of a system according to this embodiment. As shown in FIG. 1, a plurality of indices $P^1$ to $P^4$ are laid out on a physical space, and the system according to this embodiment includes an image sensing device 1020 which senses an image of this physical space, and an image processing apparatus 1000 which processes the sensed image of the image sensing device 1020. An orientation sensor 1010 as an object to be calibrated by the image processing apparatus 1000 is attached to the image sensing device 1020.

The system according to this embodiment and the physical space to be handled by this system will be described in detail below with reference to FIG. 1.

The orientation sensor 1010 as an object to be calibrated measures the orientation of the sensor itself on a sensor coordinate system. The orientation sensor 1010 includes a tiltmeter (not shown) which can measure the direction of gravitational force of the earth, and one axis of the sensor coordinate system (Z-axis in this embodiment) is set in a direction opposite to the direction of the gravitational force. The orientation information (the orientation measured value having three degrees of freedom) measured by the orientation sensor 1010 is output to a data management unit 1060 (to be described later) included in the image processing apparatus 1000 in accordance with a request from the data management unit 1060.

As described above, a plurality of reference indices Pk (k=1, . . . , K) whose positions on a world coordinate system are given are laid out on the physical space as indices (reference indices) to be sensed by the image sensing device 1020. Note that the world coordinate system is a coordinate system which defines one point on the physical space as an origin, and defines three axes orthogonal to each other at that origin as X-, Y-, and Z-axes.

The reference indices Pk are desirably laid out so that the image sensing device 1020 upon acquiring sensor calibration data can observe at least three indices or more. FIG. 1 shows a situation in which four reference indices $P^1$, $P^2$, $P^3$, and $P^4$ are laid out, and the field of view of the image sensing device 1020 includes the three indices $P^1$, $P^3$, and $P^4$ of these indices.

The reference indices Pk may be configured by circular markers respectively having different colors or by feature points such as natural features respectively having different texture features. Also, rectangular indices each of which is formed by a rectangular single-color region having a certain area may be used as indices. Any of these indices may be used as long as the image coordinates of projected images on a sensed image by the image sensing device 1020 can be detected, and these indices can be identified from each other.

When the image sensing device 1020 senses an image of such physical space, it outputs the sensed image (the image of the physical space or sensed image) to an image input unit 1030 (to be described below) included in the image processing apparatus 1000.

The image input unit 1030 outputs the sensed image received from the image sensing device 1020 to a subsequent index detection unit 1040.

The index detection unit 1040 detects image coordinates $u^{Pk}$ of the reference indices Pk located in the sensed image received from the image input unit 1030. For example, when the reference indices Pk are configured by markers respectively having different colors, the index detection unit 1040 detects regions corresponding to the respective marker colors from the sensed image, and determines the barycentric positions of these regions as image coordinates. When the reference indices Pk are configured by feature points respectively having different texture features, the index detection unit 1040 applies template matching to the sensed image using template images of the respective indices held in advance as given information, thereby detecting the image coordinates of the indices. When rectangular indices are used as the reference indices, the index detection unit 1040 applies binarization processing to the sensed image and then executes labeling, thereby detecting, as index candidates, regions each of which is formed by four straight lines from those which have a predetermined area or more. Furthermore, the index detection unit 1040 eliminates detection errors by checking whether or not the candidate regions include specific patterns, thus calculating the final image coordinates of the indices. Also, the index detection unit 1040 acquires identifiers of the indices. Note that each rectangular index detected in this way is considered as four indices individually formed by four vertices.

The detected image coordinates $u^{Pkn}$ of the respective reference indices Pkn and their identifiers kn are output to the data management unit 1060 in accordance with a request from the data management unit 1060. Note that n (n=1, . . . , N) is an index for each of the detected indices, and N represents the total number of detected indices. For example, in case of FIG. 1, N=3, and identifiers k1=1, k2=3, and k3=4 and corresponding image coordinates $u^{Pk1}$, $u^{Pk2}$, and $u^{Pk3}$ are output to the data management unit 1060.

A position and orientation input unit 1050 calculates position and orientation information of the image sensing device 1020 on the world coordinate system, and outputs the calculated position and orientation information to the data management unit 1060 in accordance with a request from the data management unit 1060. An approximate position and orientation of the image sensing device 1020 on the world coordinate system may use output values of, e.g., a six-degrees-of-freedom position and orientation sensor attached to the image sensing device 1020. Alternatively, the position and orientation input unit 1050 acquires world coordinates $x_w^{Pkni}$ of the reference indices on the world coordinate system, and the image coordinates and identifiers of the respective reference coordinates obtained by the index detection unit 1040 from the data management unit 1060. By solving a linear simultaneous equation obtained from the correspondence between the image coordinates and world coordinates, the position and orientation input unit 1050 may estimate the position and orientation information of the image sensing device 1020 on the world coordinate system. In this way, the method of calculating the position and orientation of the image sensing device 1020 on the world coordinate system is not particularly limited.

Upon reception of an instruction of "data acquisition" (data acquisition instruction) from an instruction unit 1080, the data management unit 1060 acquires the orientation measured value from the orientation sensor 1010, and acquires the image coordinates and identifiers of the reference indices from the index detection unit 1040. The data management unit 1060 generates set data [orientation measured value—image coordinates of reference index—identifier of reference index] for each detected index, and registers the generated set data for respective indices in one data list.

Note that the orientation measured value input from the orientation sensor 1010 is measured at the same time (including nearly the same time) as the image sensing time of the sensed image from which the image coordinates of the reference indices, input from the index detection unit 1040, are detected. The position and orientation information calculated by the position and orientation input unit 1050 indicates the position and orientation of the image sensing device 1020 at the same time (including nearly the same time) as that image sensing time.

Upon reception of a request from a calibration information calculation unit 1090, the data management unit 1060 outputs the generated data list to the calibration information calculation unit 1090.

A contribution degree calculation unit 1070 calculates contribution degrees $\epsilon_\tau^{Pkn}$ as parameter values using orientation information included in the position and orientation information calculated by the position and orientation input unit 1050. The contribution degree calculation unit 1070 registers the calculated contribution degrees in the above data list.

That is, with the above arrangement, set data are generated for respective indices detected from one sensed image, and the contribution degrees are specified according to the orientation information of the image sensing device 1020 at the time of sensing of that sensed image. The specified contribution degrees can be registered in the data list together with the respective generated set data.

In the contribution degree calculation unit 1070, data each indicating the correspondence between the orientation of the image sensing device 1020 and the contribution degree (relationship information) are registered in advance. For example, the contribution degrees are set for respective orientations within a certain possible range of the image sensing device 1020. The contribution degrees corresponding to the orientations with higher frequencies at the time of use of the image sensing device 1020 assume higher values. In this way, assume that the data indicating the correspondence between the orientations of the image sensing device 1020 and the contribution degrees are generated in advance, and are registered in the contribution degree calculation unit 1070.

The frequencies of the orientations at the time of use of the image sensing device 1020 may be those of the orientations at the time of all uses, may be those of the orientations at the time of some uses, or may be those of the orientations when the image sensing device 1020 and orientation sensor 1010 are used together.

The contribution degree calculation processing executed by the contribution degree calculation unit 1070 according to this embodiment will be described in detail below.

Each contribution degree $\epsilon_\tau^{Pkn}$ is calculated using a weighting function having the orientation of the image sensing device 1020 (the orientation information included in the position and orientation information calculated by the position and orientation input unit 1050) as an argument. The weighting function is positive (>0), and may be that (a function that generates a stochastic model and applies a large weight to the model that well fits observation data) used in M-estimation as one of robust estimation methods or may be a function calculated experimentally and empirically.

Figure 2:
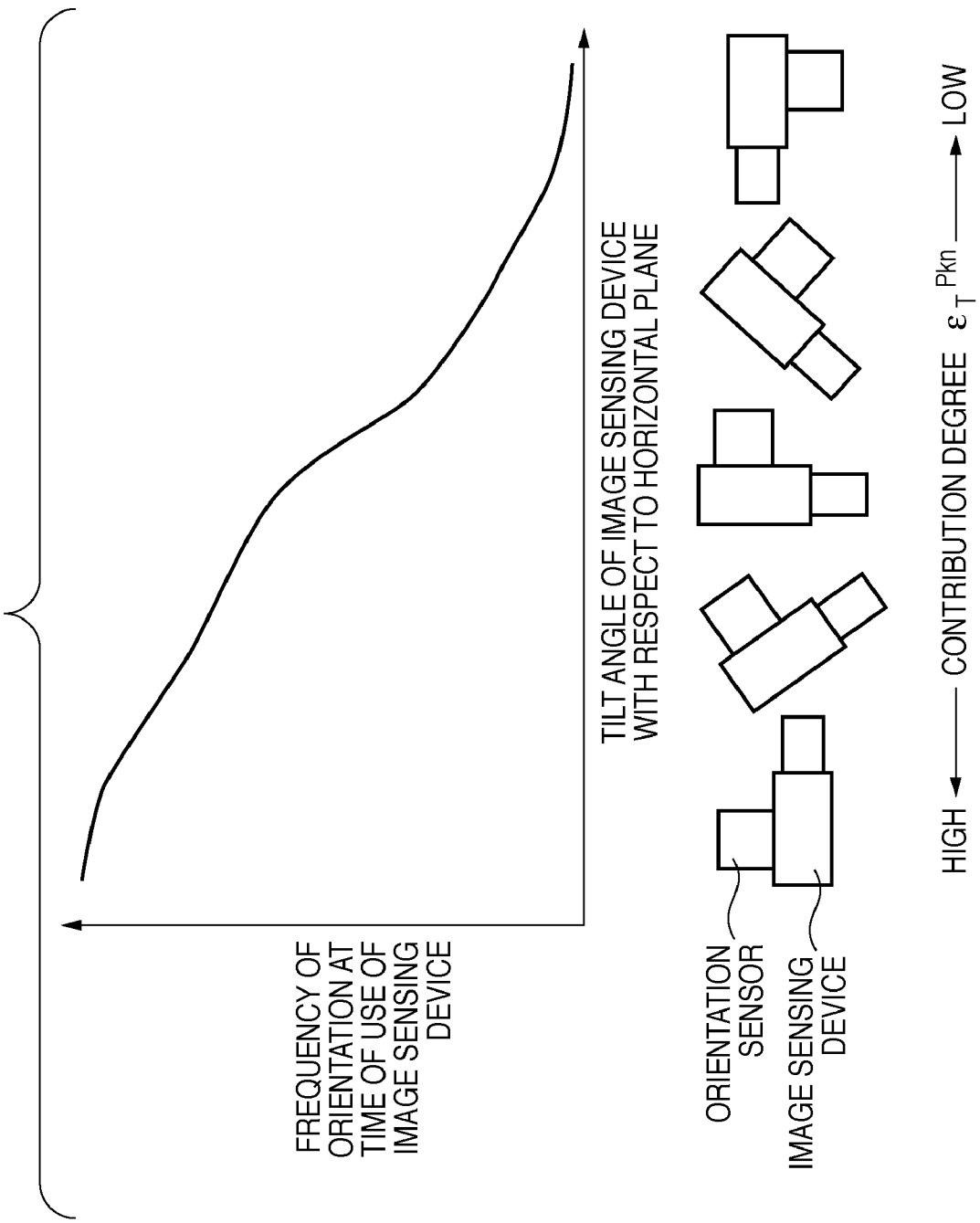
FIG. 2 is a view showing the relationship between the tilt angles of an image sensing device 1020 and their frequencies.

For example, assume that each orientation information of the image sensing device 1020 is defined using the tilt angle of the image sensing device 1020 with respect to the horizontal plane, and the relationships between the tilt angles and the frequencies of orientations at the time of use of the image sensing device 1020 is given, as shown in FIG. 2. In this case, the contribution degree $\epsilon_\tau^{Pkn}$ may be defined by a weighting function which gives a large contribution degree to an orientation with a high frequency, and a small contribution degree to an orientation with a low frequency.

Therefore, in this case, the contribution degree calculation unit 1070 calculates a corresponding contribution degree by inputting the orientation information included in the position and orientation information calculated by the position and orientation input unit 1050 to such weighting function.

Alternatively, the relationships between the orientation information of the image sensing device 1020 and the frequencies of orientations at the time of use of the image sensing device 1020 may be modeled by the following method. That is, when the tilt angle falls within the range from 0° to 30°, the contribution degree $\epsilon_\tau^{Pkn}=0.7$ is set; when the tilt angle falls within the range from 30° to 45°, the contribution degree $\epsilon_\tau^{Pkn}=0.5$ is set; and when the tilt angle falls within a range from 45° to 90°, the contribution degree $\epsilon_\tau^{Pkn}=0.1$ is set.

Therefore, in this case, the contribution degree calculation unit 1070 calculates a contribution degree modeled in association with the orientation information included in the position and orientation information calculated by the position and orientation input unit 1050.

As is known, the tilt angle of the image sensing device 1020 with respect to the horizontal plane can be calculated by a known method, and a description thereof will not be given.

Upon input of a data acquisition command from an operator (not shown), the instruction unit 1080 outputs the "data acquisition" instruction to the data management unit 1060. Upon input of a calibration information calculation command, the instruction unit 1080 transmits a "calibration information calculation" instruction to the calibration information calculation unit 1090. The operator can input a command to the instruction unit 1080 by, e.g., pressing a key to which a specific command is assigned using a keyboard. Also, the operator may input a command via a GUI displayed on a display. Hence, the command input method is not particularly limited.

Upon reception of the "calibration information calculation" instruction (calculation instruction) from the instruction unit 1080, the calibration information calculation unit 1090 acquires the data list from the data management unit 1060. Then, the calibration information calculation unit 1090 executes calibration processing (to be described in detail later) using the respective set data registered in the acquired data list, and outputs calibration information (i.e., Local Transform) obtained as a result of that processing. Alternatively, the calibration information calculation unit 1090 may output a latest azimuth drift error correction value obtained during the calculation process of the calibration information.

The aforementioned arrangement is that for acquiring the orientation information of the orientation sensor 1010 attached to the image sensing device 1020 with respect to the image sensing device 1020. An arrangement to be described below is that for presenting MR so as to confirm the calibration result obtained by the above arrangement.

A position and orientation calculation unit 1100 acquires the orientation measured value from the orientation sensor 1010, acquires the image coordinates and identifiers of the reference indices from the index detection unit 1040, and also acquires the calibration information from the calibration information calculation unit 1090. Using these pieces of information, the position and orientation calculation unit 1100 calculates the position and orientation of the image sensing device 1020 on the world coordinate system.

The position and orientation calculation unit 1100 sets initial estimated values in an azimuth drift error correction value of the orientation sensor 1010 and the position of the image sensing device 1020 on the world coordinate system. These values may be interactively input by the operator for an initial frame or may use the optimization result in the previous frame. Alternatively, values obtained during the process in the position and orientation input unit 1050 may be input or estimated values obtained during the process in the calibration information calculation unit 1090 may be set. Subsequently, the position and orientation calculation unit 1100 calculates the position and orientation of the image sensing device 1020 on the world coordinate system based on the estimated values of the azimuth drift error correction value of the orientation sensor 1010 and the position of the image sensing device 1020 on the world coordinate system, which are set in this way. The orientation of the image sensing device 1020 on the world coordinate system is calculated based on the following pieces of information:

the Local Transform as calibration information input from the calibration information calculation unit 1090;

the World Transform that can be uniquely determined from the definitions of the direction of gravitational force of the sensor coordinate system and world coordinate system;

the estimated value of the azimuth drift error correction value; and the orientation measured value input from the orientation sensor 1010.

Then, errors between the theoretical values of the image coordinates of the reference indices calculated from the position and orientation, and the actually measured values of the image coordinates of the reference indices are minimized by repetitive calculations like a Gauss-Newton method using image Jacobians. In this way, the estimated values of the azimuth drift error correction value of the orientation sensor 1010 and the position of the image sensing device 1020 on the world coordinate system are optimized. Furthermore, the position and orientation of the image sensing device 1020 on the world coordinate system are calculated as the position and orientation information from the obtained estimated values, and are output to a subsequent image generation unit 1110.

Since the orientation is calculated based on the assumption that the given Local Transform is correct, the calculated orientation of the image sensing device 1020 reflects the precision of the Local Transform.

Upon reception of the position and orientation information from the position and orientation calculation unit 1100, the image generation unit 1110 sets a viewpoint having the position and orientation indicated by that position and orientation information on a virtual space. Then, the image generation unit 1110 generates an image of the virtual space viewed from that viewpoint. Since a technique for generating an image of the virtual space viewed from the viewpoint having a predetermined position and orientation is known to those who are skilled in the art, a detailed description thereof will not be given. The image generation unit 1110 outputs data of the generated image of the virtual space to a subsequent image composition unit 1120.

The image composition unit 1120 acquires the sensed image from the image sensing device 1020, and acquires the image of the virtual space from the image generation unit 1110. The image composition unit 1120 generates a composite image by superimposing the image of the virtual space on the sensed image, i.e., an image of an MR space. Since processing for generating an image of the MR space using the sensed image and the image of the virtual space is known processing, a description thereof will not be given. The image composition unit 1120 outputs data of the generated image of the MR space to a subsequent image display unit 1130.

The image display unit 1130 comprises a CRT, liquid crystal display, or the like, and displays the image of the MR space based on the data received from the image composition unit 1120. With this display, the MR can be presented to the operator. The operator can determine the precision of the calibration result based on the precision of registration between the physical and virtual spaces in the presented image.

Note that the image display unit 1130 may be integrated with the image sensing device 1020. In this case, the image sensing device 1020 and image display unit 1130 can configure a so-called head mounted display.

Figure 3:
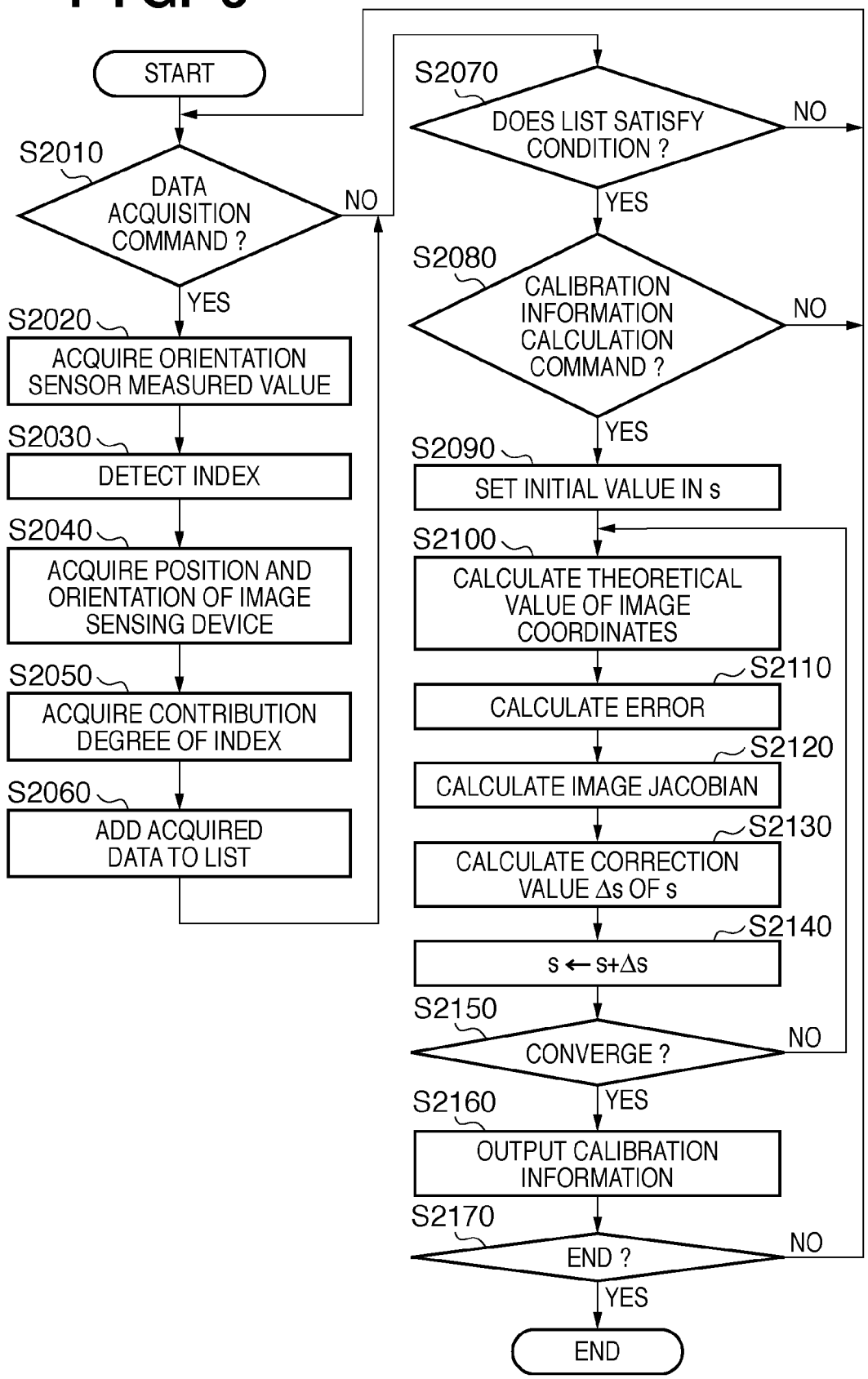
FIG. 3 is a flowchart of processing to be executed by an image processing apparatus 1000 so as to generate calibration information.

The processing to be executed by the image processing apparatus 1000 to generate calibration information will be described below using FIG. 3 that shows the flowchart of this processing.

The instruction unit 1080 checks in step S2010 if the operator inputs a data acquisition command. The operator inputs the data acquisition command when he or she lays out the image sensing device 1020 at a position where data for sensor calibration is to be acquired. If the data acquisition command is input, the instruction unit 1080 issues a "data acquisition" instruction to the data management unit 1060, and the process advances to step S2020. On the other hand, if no data acquisition command is input, the instruction unit 1080 does not issue any instruction, and the process advances to step S2070.

In the following description, as an identifier of an input time of the data acquisition command, symbol $\tau$ is used. In the following description, assume that if times $\tau$ are different, the positions and orientations of the image sensing device 1020 (viewpoint) are also different. That is, $\tau$ can also be considered as an identifier of the position and orientation of the viewpoint.

In step S2020, the data management unit 1060 acquires an orientation measured value including three degrees of freedom, which is measured by the orientation sensor 1010 at the time $\tau$, from the orientation sensor 1010. This orientation measured value is internally expressed by a 3-valued vector. Various methods of expressing an orientation by three values are available. In this embodiment, assume that the orientation measured value is expressed by a 3-valued vector, which defines a rotation angle by the vector magnitude, and a rotation axis direction by the vector direction. In this embodiment, the orientation measured value input to the data management unit 1060 in step S2020 is expressed by a 3D vector $m_\tau = [\xi_{m\tau} \, \psi_{m\tau} \, \zeta_{m\tau}]^T$.

In step S2030, the data management unit 1060 acquires the image coordinates $u^{Pkn}$ and identifiers kn of the reference indices Pkn detected by the index detection unit 1040 at the time $\tau$ from the index detection unit 1040. The index detection unit 1040 always applies reference index detection processing to a sensed image input from the image sensing device 1020 via the image input unit 1030. Therefore, as a result of the process in this step, the image coordinates and identifiers of the reference indices when the orientation measured value of the orientation sensor 1010 is $m_\tau$ can be obtained. Note that information input from the index detection unit 1040 need not always be that associated with all the reference indices, and may be that associated with reference indices detected on the sensed image at that time.

In step S2040, the data management unit 1060 acquires the position and orientation information of the image sensing device 1020 on the world coordinate system, which is calculated by the position and orientation input unit 1050 at the time $\tau$, from the position and orientation input unit 1050.

In step S2050, the data management unit 1060 acquires the contribution degrees $\epsilon_\tau^{Pkn}$ calculated by the contribution degree calculation unit 1070 from the contribution degree calculation unit 1070.

In step S2060, the data management unit 1060 adds the input data set to a data list L. More specifically, let $m_{\tau i}=[\xi_{m\tau i} \psi_{m\tau i} \zeta_{m\tau i}]^T$ be the orientation measured value $m_\tau$ input from the orientation sensor 1010. Also, let ki be the identifiers kn input from the index detection unit 1040. Likewise, $u_i^{Pki}$ be the image coordinates (coordinate values) $u^{Pkn}$ input from the index detection unit 1040. In addition, let $\epsilon_{\tau i}^{Pki}$ be the contribution degrees $\epsilon_\tau^{Pkn}$ input from the contribution degree calculation unit 1070. Then, the data management unit 1060 registers set data $[m_{\tau i}, u_i^{Pki}, ki, \epsilon_{\tau i}^{Pki}]$ as the i-th set data in the data list L. Note that i (i=1, ..., I) is an index for each of set data registered in the data list L, and $\tau$i represents the identifier of an input time of the i-th set data. Also, I represents the total number of set data registered in the data list.

With the aforementioned processes, the operation for acquiring sensor correction data is executed.

In the following processes, calibration information is calculated using the acquired data.

The data management unit 1060 checks in step S2070 if the currently held data list has information enough to calculate calibration information. As a result of checking, if it is determined that the data list has enough information, the process advances to step S2080. On the other hand, if it is determined that the data list does not have enough information, the process returns to step S2010.

As a condition used to determine if the data list has information enough to calculate calibration information, for example, the following condition is available. That is, it is checked if the data list L includes data associated with at least three different reference indices Pk or more, which were sensed in two frames (two times, and two viewpoint positions) or more. However, since the precision of calibration information to be derived can improve with increasing diversity of input data, a condition may be set to require more data.

The instruction unit 1080 checks in step S2080 if the operator inputs a calibration information calculation command. If the calibration information calculation command is input, the instruction unit 1080 issues a "calibration information calculation" instruction to the data management unit 1060, and the process advances to step S2090. On the other hand, if no calibration information calculation command is input, the instruction unit 1080 does not issue any instruction, and the process returns to step S2010.

The calibration information calculation unit 1090 handles the calibration information to be calculated, i.e., the Local Transform, as a 3-valued vector $\omega_{SC}=[\xi \, \psi \, \zeta]^T$. Also, the calibration information calculation unit 1090 internally uses a position $t_{WC\tau}=[x_{\tau} \, y_{\tau} \, z_{\tau}]^T$ (unknown value) of the image sensing device 1020 on the world coordinate system at each time $\tau$ during the process of calibrating the Local Transform.

Furthermore, the calibration information calculation unit 1090 also internally uses a correction value $\alpha_\tau$ (unknown value) of an azimuth drift error at each time $\tau$ during the process of calibrating the Local Transform. In the following description, these unknown parameters are described using a (3+4T)-dimensional state vector $s=[\omega_{SC} \, t_{WC1} \, \alpha_1 \ldots t_{WC\tau} \, \alpha_\tau \ldots t_{WCT} \, \alpha_T]^T$. Note that T represents the number of different frames (different times and different viewpoint positions) included in the data list.

In step S2090, the calibration information calculation unit 1090 gives appropriate initial values to the state vector s. The initial values are given in advance by operator's interactive setting operations or the like. Alternatively, as for an initial value of $t_{WC\tau}$, position information of the image sensing device 1020, which is calculated by the position and orientation input unit 1050, may be used. As for an initial value of $\omega_{SC}$, a value roughly calculated by the method described in patent reference 1 may be used. As for an initial value of $\alpha_{\tau i}$, a value roughly calculated at a certain time by the method described in patent reference 1 using the initial value of $\omega_{SC}$ may be used.

In step S2100, the calibration information calculation unit 1090 executes the following process. That is, the calibration information calculation unit 1090 calculates theoretical values $u_i^{Pki'}=[u_{xi}^{Pki'}, u_{yi}^{Pki'}]$ of the image coordinates of the respective reference indices Pki for all "i"s from the respective set data $[m_{\tau i} \, u_i^{Pki} \, ki]$ (i=1, 2, ..., I) in the data list L and the state vector s. Note that the theoretical values of the image coordinates of the reference indices indicate the positions (coordinates) where the reference indices whose positions on the world coordinate system are given are to be seen in the sensed image when the position and orientation of the image sensing device 1020 on the world coordinate system are given. That is, the theoretical values indicate positions where the layout positions of the indices on the physical space are projected onto a sensed image based on the position and orientation information of the image sensing device 1020.

The orientation of the image sensing device 1020 on the world coordinate system at a time $\tau$i can be calculated based on the following pieces of information:

the coordinate transform (World Transform) that transforms the orientation on the sensor coordinate system into that on the world coordinate system;

the orientation of the orientation sensor 1010 itself on the sensor coordinate system (the orientation measured value of the orientation sensor 1010: $m_{\tau i}$);

the correction value $\alpha_{\tau i}$ of the azimuth drift error; and the coordinate transform (Local Transform: $\omega_{SC}$) that transforms the orientation of the orientation sensor 1010 itself into that of an object to be measured.

Therefore, each theoretical value $u_i^{Pki'}$ is calculated based on the following equation having, as variables, s including the position $t_{WC\tau i}$ of the image sensing device 1020 on the world coordinate system, and $\omega_{SC}$ and $\alpha_{\tau i}$ involved in calculations of the orientation of the image sensing device 1020 on the world coordinate system:

$$u_i^{Qki'}=F_{\tau i}(s) \qquad (1)$$

More specifically, the function $F_{\tau i}(\ )$ is configured by:

$$x_{Ci}^{Pki} = \begin{bmatrix} x_{Ci}^{Pki} & y_{Ci}^{Pki} & z_{Ci}^{Pki} & 1 \end{bmatrix}^T \qquad (2)$$
$$= (\Delta R(\alpha_{\tau i}) \cdot R_{WT} \cdot R_{TS_{\tau i}}(\omega_{SC}))^{-1} \cdot (x_W^{Pki} - t_{WC_{\tau i}})$$

$$u_i^{Pki'} = [u_{xi}^{Pki'} \; u_{yi}^{Pki'}] = \left[-f_x \frac{x_{Ci}^{Pki}}{z_{Ci}^{Pki}} \; -f_y \frac{y_{Ci}^{Pki}}{z_{Ci}^{Pki}}\right]^T \quad (3)$$

Equation (2) is required to calculate, from s, a position vector $x_{Ci}^{Pki}$ on a camera coordinate system of the reference index Pki whose position on the world coordinate system upon acquisition of the i-th set data (when the orientation measured value of the orientation sensor 1010 is $m_{\tau i}$) is $x_{WPki}$. Note that $s = [\omega_{SC} \; t_{WC1} \; \alpha_1 \ldots t_{WC\tau i} \; \alpha_{\tau i} \ldots t_{WCT} \; \alpha_T]^T$. The camera coordinate system defines one point on the image sensing device 1020 as an origin, and three axes which are orthogonal to each other at that origin as X-, Y-, and Z-axes.

Equation (3) is required to calculate the coordinates $u_i^{Pki}$ on the sensed image of the reference index Pki from $x_{Ci}^{Pki}$.

In equation (3), fx and fy are the focal lengths of the image sensing device 1020 in the x- and y-axis directions, and the calibration information calculation unit 1090 holds them in advance as given values. Furthermore, as for layout position information indicating a layout position on the physical space of each of a plurality of indices laid out on the physical space, the calibration information calculation unit 1090 holds that information as given information.

In equation (2), $R_{WT}$ is a 3×3 rotation matrix that represents the World Transform, as a parameter which can be uniquely determined from the definitions of the direction of gravitational force on the sensor coordinate system and world coordinate system, and the calibration information calculation unit 1090 holds that matrix in advance as a given value.

$\Delta R(\alpha_{\tau i})$ represents a 3×3 rotation matrix which applies rotation by $\alpha_{\tau i}$ in the azimuth direction (to correct the azimuth drift error), and is defined by:

$$\Delta R(\alpha) = \begin{bmatrix} l_1 l_1 (1-\cos\alpha) + \cos\alpha & l_2 l_1 (1-\cos\alpha) - l_3 \sin\alpha & l_3 l_1 (1-\cos\alpha) + l_2 \sin\alpha \\ l_1 l_2 (1-\cos\alpha) + l_3 \sin\alpha & l_2 l_2 (1-\cos\alpha) + \cos\alpha & l_3 l_2 (1-\cos\alpha) - l_1 \sin\alpha \\ l_1 l_3 (1-\cos\alpha) - l_2 \sin\alpha & l_2 l_3 (1-\cos\alpha) + l_1 \sin\alpha & l_3 l_3 (1-\cos\alpha) + \cos\alpha \end{bmatrix} \quad (4)$$

where $l = (l_1, l_2, l_3)$ represents a given vector that expresses the vertically upward direction (a direction opposite to the gravitational force of the earth) of the world coordinate system, and the calibration information calculation unit 1090 holds it in advance.

$R_{TS\tau i}$ is a 3×3 rotation matrix corresponding to the orientation measured value at the time of acquisition of the i-th set data (time $\tau i$), and is defined according to $m_{\tau i}$ by:

$$R_{TS\tau i} = \quad (5)$$

$$\begin{bmatrix} \frac{\xi_{m\tau i}^2}{\theta^2}(1-\cos\theta) + \cos\theta & \frac{\xi_{m\tau i}\psi_{m\tau i}}{\theta^2}(1-\cos\theta) - \frac{\zeta_{m\tau i}}{\theta}\sin\theta & \frac{\xi_{m\tau i}\zeta_{m\tau i}}{\theta^2}(1-\cos\theta) + \frac{\psi_{m\tau i}}{\theta}\sin\theta \\ \frac{\psi_{m\tau i}\xi_{m\tau i}}{\theta^2}(1-\cos\theta) + \frac{\zeta_{m\tau i}}{\theta}\sin\theta & \frac{\psi_{m\tau i}^2}{\theta^2}(1-\cos\theta) + \cos\theta & \frac{\psi_{m\tau i}\zeta_{m\tau i}}{\theta^2}(1-\cos\theta) - \frac{\xi_{m\tau i}}{\theta}\sin\theta \\ \frac{\zeta_{m\tau i}\xi_{m\tau i}}{\theta^2}(1-\cos\theta) - \frac{\psi_{m\tau i}}{\theta}\sin\theta & \frac{\zeta_{m\tau i}\psi_{m\tau i}}{\theta^2}(1-\cos\theta) + \frac{\xi_{m\tau i}}{\theta}\sin\theta & \frac{\zeta_{m\tau i}^2}{\theta^2}(1-\cos\theta) + \cos\theta \end{bmatrix}$$

where θ is:

$$\theta = \sqrt{\xi_{m\tau i}^2 + \psi_{m\tau i}^2 + \zeta_{m\tau i}^2} \quad (6)$$

$R_{SC}(\omega_{SC})$ is a 3×3 rotation matrix that represents the Local Transform determined by $\omega_{SC} = [\xi \; \psi \; \zeta]^T$, and is defined by an equation obtained by excluding suffices $m_{\tau i}$ in equation (5).

In step S2110, the calibration information calculation unit 1090 calculates errors $\Delta u_i^{Pki}$ between the actual image coordinates $u_i^{Pki}$ and theoretical values $u_i^{Pki'}$ of the corresponding image coordinates of the reference indices Pki included in the respective set data in the data list L for all "i"s using:

$$\Delta u_i^{Pki} = u_i^{Pki} - u_i^{Pki'} \quad (7)$$

In step S2120, the calibration information calculation unit 1090 calculates image Jacobians $J_{uis}^{Pki}$ ($= \partial u_i^{Pki}/\partial s$) associated with the state vector s for all "i"s. The image Jacobian $J_{uis}^{Pki}$ is a Jacobian matrix of 2 rows×(3+4T) columns having, as respective elements, solutions obtained by partially differentiating the function $F_{\tau i}()$ in equation (1) by respective elements of the state vector s.

More specifically, the calibration information calculation unit 1090 calculates Jacobian matrices $J_{uixCi}^{Pki}$ ($= \partial u_i^{Pki}/\partial x_{Ci}^{Pki}$) of 2 rows×3 columns, having, as respective elements, solutions obtained by partially differentiating the right-hand side of equation (3) by respective elements of the position vectors $x_{Ci}^{Pki}$ on the camera coordinate system. Furthermore, the calibration information calculation unit 1090 calculates Jacobian matrices $J_{xCis}^{Pki}$ ($= \partial x_{Ci}^{Pki}/\partial s$) of 3 rows×(3+4T) columns, having, as respective elements, solutions obtained by partially differentiating the right-hand side of equation (2) by respective elements of the state vector s. Finally, the calibration information calculation unit 1090 calculates $J_{uis}^{Pki}$ by:

$$J_{uis}^{Pki} = J_{uixCi}^{Pki} \cdot J_{xCis}^{Pki} \quad (8)$$

In step S2130, the calibration information calculation unit 1090 calculates a correction value Δs of s based on the errors $\Delta u_i^{Pki}$ and Jacobian matrices $J_{uis}^{Pki}$ for all "i"s calculated by the above processes, and the contribution degrees $\epsilon_{\tau i}^{Pki}$ of respective reference indices added to the data list L in step S2060. The calculation processing of the correction value Δs will be described below.

Initially, a (2×I)-dimensional error vector U obtained by vertically arranging the errors $\Delta u_i^{Pki}$ for all "i"s is generated, as given by:

$$U = \begin{bmatrix} \Delta u_1^{P_{k1}} \\ \Delta u_2^{P_{k2}} \\ \vdots \\ \Delta u_I^{P_{kI}} \end{bmatrix} \quad (9)$$

Also, a matrix $\Phi$ of (2×I) rows×(3+4T) columns obtained by vertically arranging the Jacobian matrices $J_{uis}^{Pki}$ of the respective indices is generated, as given by:

$$\Phi = \begin{bmatrix} J_{u_1s}^{P_{k1}} \\ J_{u_2s}^{P_{k2}} \\ \vdots \\ J_{u_Is}^{P_{kI}} \end{bmatrix} \quad (10)$$

A diagonal matrix W of (2×I) rows×(2×I) columns having, as diagonal elements, the contribution degrees $\epsilon_{\tau i}^{Pki}$ of the reference indices Pki for elements (each reference index having two elements, i.e., x- and y-coordinates) corresponding to the respective reference indices Pki is generated, as given by:

$$W = \begin{bmatrix} \varepsilon_{\tau_1}^{p_{k1}} & 0 & \cdots & \cdots & \cdots & \cdots & 0 \\ 0 & \varepsilon_{\tau_2}^{p_{k2}} & & & & & \vdots \\ \vdots & & \ddots & 0 & & & \vdots \\ \vdots & & & \ddots & & & \vdots \\ \vdots & & 0 & & \ddots & & \vdots \\ \vdots & & & & & 0 & \\ 0 & \cdots & \cdots & \cdots & \cdots & 0 & \varepsilon_{\tau_N}^{p_{kN}} \end{bmatrix} \quad (11)$$

In consideration of calculations of $\Delta s$ by the method of least squares using the matrix W as a weight, normalization formula (12) below is obtained:

$$(\Phi^T W \Phi)\Delta s = \Phi^T W U \quad (12)$$

Therefore, $\Delta s$ is calculated by:

$$\Delta s = (\Phi^T W \Phi)^{-1} \Phi^T W U \quad (13)$$

Since $\Delta s$ is the (3+4T)-dimensional vector, $\Delta s$ can be calculated if three or more reference indices are detected from two sensed images (the number of unknown parameters: 3+4×2=11<the number of equations: 2×3×2=12). Using the matrix W that represents the contribution degrees based on the possible orientations of the image sensing device 1020 in calculations of $\Delta s$, the effect of changing the contribution degrees of the reference indices to the calculations of $\Delta s$ according to the possible orientations of the image sensing device 1020 can be obtained.

In step S2140, the calibration information calculation unit 1090 corrects s using the correction value $\Delta s$ calculated in step S2130 by:

$$s + \Delta s \rightarrow s \quad (14)$$

The unit 1090 sets the obtained value as new s.

The calibration information calculation unit 1090 checks in step S2150 if the calculations have converged using an arbitrary criterion as to whether or not the error vector U is smaller than a predetermined threshold or whether or not the correction value $\Delta s$ is smaller than a predetermined threshold. As a result of such checking, if the calculations have not converged, the processes in step S2100 and subsequent steps are executed again using the state vector s after correction as an initial value. On the other hand, if the calculations have converged, the process advances to step S2160.

In step S2160, the calibration information calculation unit 1090 outputs $\omega_{SC}$ included in the obtained state vector s as a parameter indicating the Local Transform. Also, the unit 1090 may output $\alpha_T$ together as a parameter indicating the latest azimuth drift error correction value, or may output the position $t_{WCT}$ of the image sensing device 1020 together.

Finally, it is checked in step S2170 if the calibration processing is to end. This checking process is implemented by seeing if the operator issues an end instruction of the calibration processing using the instruction unit 1080 to the image processing apparatus 1000. However, other checking methods may be used. As a result of checking, if the calibration processing is to end, the processing ends; otherwise (if the operator wants to continue the calibration processing (to execute re-calibration)), the process returns to step S2010, thus waiting for an input of a data acquisition command.

The aforementioned processes in step S2090 and subsequent steps can be summarized as follows. That is, errors between projected positions, on a sensed image, of the layout positions of indices on the physical space based on the position and orientation information calculated by the position and orientation input unit 1050, and the detected image coordinates of these indices on the sensed image are calculated for the respective indices in the sensed image. The orientation of the orientation sensor 1010 with respect to the image sensing device 1020 is calculated using the errors and contribution degrees for the respective indices.

With the above processes, the orientation of the orientation sensor 1010 attached to the image sensing device 1020 with respect to the image sensing device 1020 can be acquired. In this embodiment, the calibration process of parameters indicating the calibrated Local Transform and the latest azimuth drift error is further executed after the aforementioned processes. This calibration process is to present an image of the MR space using these parameters, and the position and orientation calculation unit 1100, image generation unit 1110, image composition unit 1120, and image display unit 1130. Since this process is a state-of-the-art technique, a description thereof will not be given.

According to this embodiment, since the orientation of the orientation sensor 1010 with respect to the image sensing device 1020 is estimated in consideration of that of the image sensing device 1020, a high-precision calibration result can be acquired with respect to a situation in which the image sensing device 1020 that mounts the orientation sensor 1010 is used.

Second Embodiment

In the first embodiment, as a feature amount associated with the image coordinates of a reference index, a point feature, i.e., the image coordinates of one point that represents a projected image of an index are used. As a reference index P, an index from which such point feature can be extracted is used. However, the type of reference index and that of feature amount associated with the image coordinates of the reference index are not limited to those.

For example, using, as a feature amount associated with the image coordinates of a reference index, a line feature used in a known position and orientation measurement apparatus (for example, see "D. G. Lowe: Fitting parameterized three-dimensional models to images, IEEE Transactions on PAMI, vol. 13, no. 5, pp. 441 to 450, 1991"), an index from which a line feature can be extracted (to be referred to as a line index hereinafter) may be used as a reference index.

For example, an error vector U is configured by errors Δd calculated from detected values d from images and estimated values d* from a state vector s using distances of straight lines from an origin as a reference. Then, a matrix Φ is configured by Jacobian matrices $J_{ds}$ (=∂d/∂s) of 1 row×(3+4T) columns, having, as respective elements, solutions obtained by partially differentiating the calculation formula of d* by respective elements of the state vector s. As a result, the position and orientation can be measured using the same framework as in the first embodiment. Of course, both line and point indices can be used together.

Third Embodiment

The respective units that configure the image processing apparatus 1000 shown in FIG. 1 may be implemented by hardware components, or some or all of these units may be implemented by software. Note that some of components that configure the image processing apparatus 1000 are described as a main body which holds and manages data. Upon implementing such component by software, data described as those to be held and managed by that component may be stored in a memory of a computer which executes software corresponding to this component, and that component may manage these data.

Figure 4:
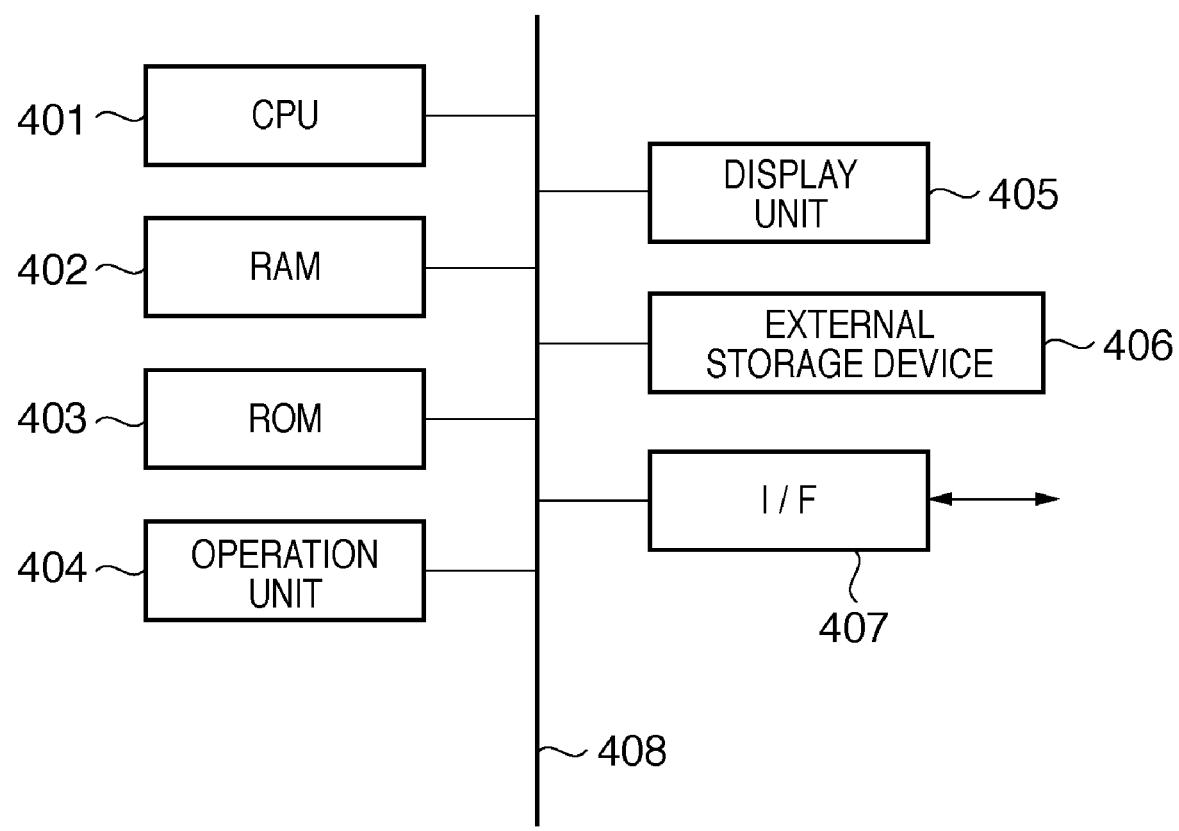
FIG. 4 is a block diagram showing an example of the hardware arrangement of a computer applicable to the image processing apparatus 1000.

FIG. 4 is a block diagram showing an example of the hardware arrangement of a computer applicable to the image processing apparatus 1000.

A CPU 401 controls the overall computer using computer programs (programs) and data stored in a RAM 402 and ROM 403, and executes the aforementioned processes as those to be implemented by the image processing apparatus 1000 to which this computer is applied.

The RAM 402 has an area for temporarily storing programs and data loaded from an external storage device 406, and an area for temporarily storing data and the like externally received via an I/F (interface) 407. Furthermore, the RAM 402 has a work area used when the CPU 401 executes respective processes. In this way, the RAM 402 can provide various areas as needed.

The ROM 403 stores setting data, a boot program, and the like of this computer.

An operation unit 404 includes a keyboard, mouse, and the like. When the user of this computer operates the operation unit 404, he or she can input various instructions to the CPU 401. Note that when the instruction unit 1080 shown in FIG. 1 is implemented by software, the instruction unit 1080 is used to output operation instructions with respect to the operation unit 404 to the data management unit 1060 and calibration information calculation unit 1090.

A display unit 405 comprises a CRT, liquid crystal display, or the like, and can display the processing results of the CPU 401 by means of images, characters, and the like. Note that the display unit 405 corresponds to the image display unit 1130 shown in FIG. 1.

The external storage device 406 is a large-capacity information storage device represented by a hard disk drive. The external storage device 406 saves an OS (operating system), programs and data for making the CPU 401 execute the aforementioned processes as those to be implemented by the image processing apparatus 1000, and the like.

These programs include those for making the CPU 401 implement the functions corresponding to the following units shown in FIG. 1: the position and orientation input unit 1050, contribution degree calculation unit 1070, index detection unit 1040, data management unit 1060, instruction unit 1080, calibration information calculation unit 1090, position and orientation calculation unit 1100, image generation unit 1110, and image composition unit 1120.

Also, the data saved in the external storage device 406 include those described as given information in the above description, and those to be saved and managed by components shown in FIG. 1.

The programs and data saved in the external storage device 406 are loaded onto the RAM 402 as needed under the control of the CPU 401, and are to be processed by the CPU 401.

To the I/F 407, the orientation sensor 1010 and image sensing device 1020 shown in FIG. 1 are connected. This computer acquires the orientation measured value from the orientation sensor 1010, and acquires sensed images from the image sensing device 1020 via the I/F 407.

Reference numeral 408 denotes a bus which interconnects the aforementioned units.

Note that the hardware arrangement of the computer applicable to the image processing apparatus 1000 is not limited to that shown in FIG. 4, and various other arrangements may be used.

Other Embodiments

The objects of the present invention can be achieved as follows. That is, a recording medium (or storage medium) that records program codes of software required to implement the functions of the aforementioned embodiments is supplied to a system or apparatus. That storage medium is a computer-readable storage medium, needless to say. A computer (or a CPU or MPU) of that system or apparatus reads out and executes the program codes stored in the recording medium. In this case, the program codes themselves read out from the recording medium implement the functions of the aforementioned embodiments, and the recording medium that records the program codes constitutes the present invention.

When the computer executes the readout program codes, an operating system (OS) or the like, which runs on the computer, executes some or all of actual processes based on instructions of these program codes. The present invention also includes a case in which the functions of the aforementioned embodiments are implemented by these processes.

Furthermore, assume that the program codes read out from the recording medium are written in a memory equipped on a function expansion card or function expansion unit which is inserted in or connected to the computer. After that, a CPU or the like equipped on the function expansion card or unit executes some or all of actual processes based on instructions of these program codes, thereby implementing the functions of the aforementioned embodiments.

When the present invention is applied to the recording medium, that recording medium stores program codes corresponding to the aforementioned flowchart.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-025731 filed Feb. 5, 2008, which is hereby incorporated by reference herein in its entirety.

What is claimed is:

1. An image processing apparatus comprising:
a unit which holds layout position information indicating a layout position on a physical space of each of a plurality of indices laid out on the physical space;
a unit which acquires an image of the physical space by sensing the physical space using an image sensing device attached with an orientation sensor;
a unit which detects indices in the image of the physical space, and calculates coordinate values of the detected indices in the image;
a unit which acquires orientation information measured by the orientation sensor at the time of sensing of the image of the physical space;
an acquisition unit which acquires position and orientation information of the image sensing device at the time of sensing of the image of the physical space, and acquires a parameter value according to a frequency at which the image sensing device is located to have an orientation indicated by orientation information included in the acquired position and orientation information;
a generation unit which generates sets of the coordinate values and the orientation information for the respective indices in the image of the physical space; and
a calculation unit which calculates an orientation of the orientation sensor with respect to the image sensing device using the position and orientation information, the parameter value, and the sets generated for the respective indices by said generation unit,
wherein said calculation unit calculates errors between projected positions, on the image of the physical space, of the layout positions indicated by the layout position information based on the position and orientation information, and positions indicated by the coordinate values for the respective indices in the image of the physical space, and calculates the orientation of the orientation sensor with respect to the image sensing device using the calculated errors for the respective indices and the parameter value.

2. The apparatus according to claim 1, further comprising:
a unit which inputs a data acquisition instruction; and
a unit which inputs a calculation instruction,
wherein said unit which calculates the coordinate values, said acquisition unit, and said generation unit operate when the data acquisition instruction is input, and
said calculation unit operates when the calculation instruction is input.

3. The apparatus according to claim 1, wherein a higher parameter value is assigned to an orientation with a higher frequency of possible orientations of the image sensing device, and upon acquisition of position and orientation information of the image sensing device at the time of sensing of the image of the physical space, said acquisition unit acquires a parameter value assigned to orientation information included in the acquired position and orientation information.

4. An image processing method to be executed by an image processing apparatus, which holds layout position information indicating a layout position on a physical space of each of a plurality of indices laid out on the physical space, comprising:
a step of acquiring an image of the physical space by sensing the physical space using an image sensing device attached with an orientation sensor;
a step of detecting indices in the image of the physical space, and calculating coordinate values of the detected indices in the image;
a step of acquiring orientation information measured by the orientation sensor at the time of sensing of the image of the physical space;
an acquisition step of acquiring position and orientation information of the image sensing device at the time of sensing of the image of the physical space, and acquiring a parameter value according to a frequency at which the image sensing device is located to have an orientation indicated by orientation information included in the acquired position and orientation information;
a generation step of generating sets of the coordinate values and the orientation information for the respective indices in the image of the physical space; and
a calculation step of calculating an orientation of the orientation sensor with respect to the image sensing device using the position and orientation information, the parameter value, and the sets generated for the respective indices in the generation step,
wherein in the calculation step, errors between projected positions, on the image of the physical space, of the layout positions indicated by the layout position information based on the position and orientation information, and positions indicated by the coordinate values are calculated for the respective indices in the image of the physical space, and the orientation of the orientation sensor with respect to the image sensing device is calculated using the calculated errors for the respective indices and the parameter value.

5. A non-transitory computer-readable storage medium for storing a computer program for making a computer function as units of an image processing apparatus according to claim 1.

* * * * *